Nov. 22, 1955   F. A. HARRINGTON   2,724,822
INDICATOR LIGHT WITH CONTROL RELAY
Filed Feb. 27, 1952
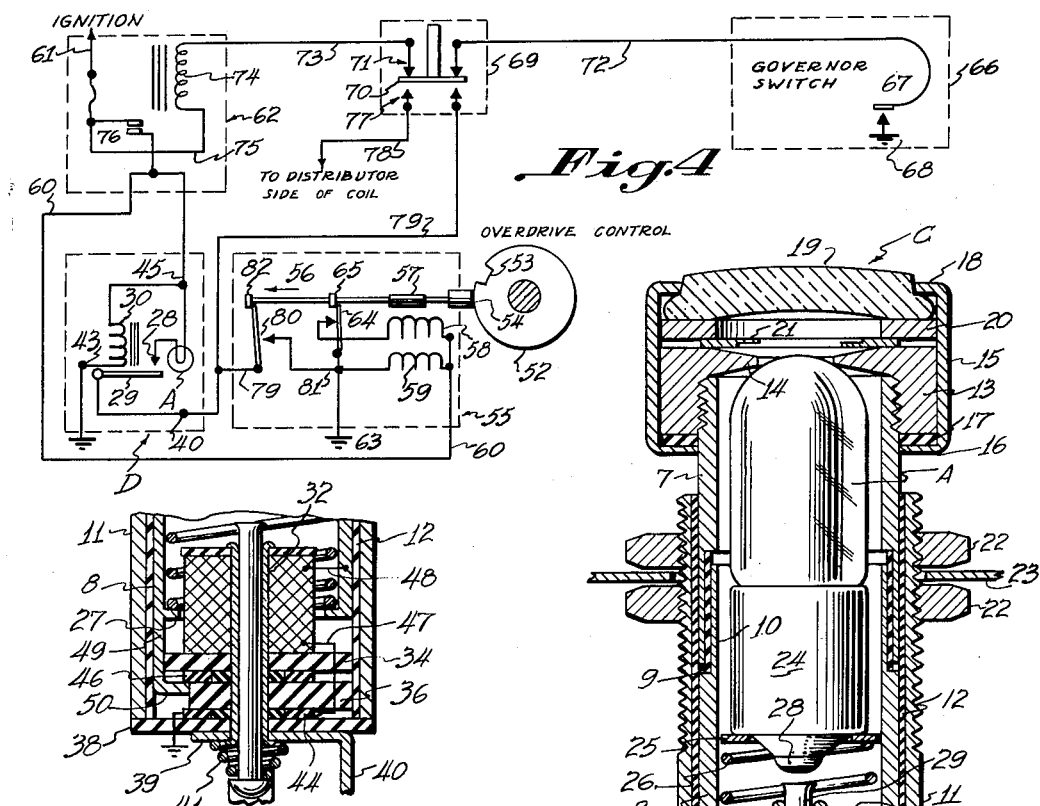
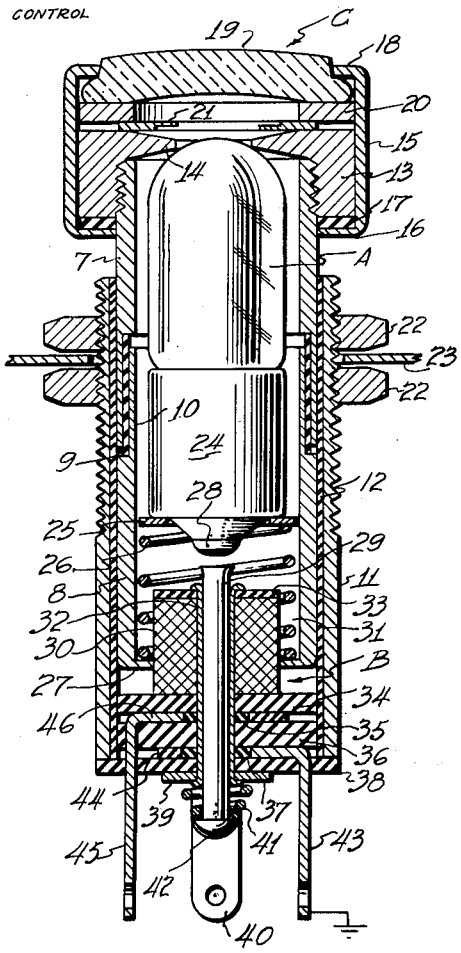
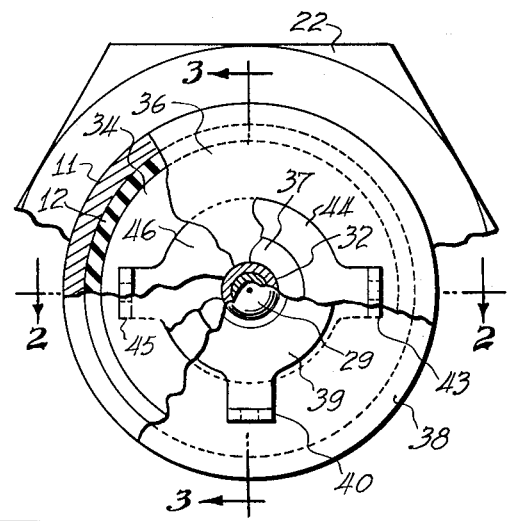
INVENTOR.
FRANK A. HARRINGTON.
BY Lynn Latta
ATTORNEY.

United States Patent Office 2,724,822
Patented Nov. 22, 1955

2,724,822

INDICATOR LIGHT WITH CONTROL RELAY

Frank A. Harrington, Brea, Calif., assignor to Marco Industries Company, Beverly Hills, Calif., a corporation of California Application February 27, 1952, Serial No. 273,661

4 Claims. (Cl. 340—252)

This invention relates to indicators (e. g. indicator lights). A general object of the invention is to provide an indicator which is particularly adapted for use in indicating the condition of operation of a multiple electrical circuit for energizing, from a single source, two or more electrical devices, where it is required that the indicator be actuated to indicate energizing of one of the devices but is not to be actuated when the other device is energized.

The invention is particularly directed to the indication of operational conditions is a multiple electric circuit embodying as a part thereof, apparatus of such a sensitive nature that the operation thereof may be affected by the diversion of a portion of the current to the actuation of the indicator (e. g. heating the filament of an indicator light). Accordingly, one of the primary objects of the invention is to provide an indicator having means for energizing the same in such a manner that such energization thereof does not appreciably change the resistance in the circuit of the sensitive apparatus. More specifically, the invention aims to provide an indicator which may be energized from the same source which energizes the sensitive apparatus, but which is at all times isolated from the immediate circuit of the sensitive apparatus and yet is arranged to indicate when that sensitive apparatus is energized or deenergized.

An example of one useful application of the invention is the indication of the condition of operation of an overdrive transmission in an automobile. In such application, the invention provides an indicator device to indicate when the transmission is in overdrive. In the conventional overdrive transmission, a solenoid operated pawl or locking dog is arranged to interengage with a rotatable element (e. g. a sun gear which, when held stationary, will establish the overdrive condition) the pawl being spring biased toward such engagement position and being retracted by solenoid operation. Before the solenoid can withdraw the pawl, the torque acting between the rotatable element and the pawl must be released so as to release the grip of the rotatable element upon the pawl and allow the latter to be retracted by the solenoid. This is accomplished by momentarily shorting the ignition of the engine which is driving through the transmission, thereby effecting a momentary reversal of drive which moves the rotatable element in the opposite direction from which the torque was acting, freeing the pawl. This is commonly referred to as the "kick-down" operation and is effected by pushing the accelerator pedal to a position of maximum depression, a "kick-down" switch for effecting the ignition cutout, being associated with the accelerator pedal.

The invention provides an indicator device which is adapted to be energized through a circuit which is placed in communication with a current source by the kick-down switch in its normal, undepressed position, and which is grounded through a switch cutout forming a part of the solenoid and locking pawl unit. The cutout switch is arranged to be opened when the locking pawl is withdrawn in the kick-down operation, so as to open the ignition shorting circuit and thereby re-establish the ignition as soon as the pawl has been withdrawn. The invention provides an arrangement in which the indicator light may have its circuit completed through the above mentioned cutout switch, so as to be energized when the pawl is engaged and deenergized when the pawl is disengaged. However, such an arrangement introduces the problem of avoiding an unwanted feed-back connection from the ignition circuit to ground through the filament of the indicator light after the cutout switch is opened. As the solution to this problem, the invention provides an arrangement whereby the indicator light is isolated from said unwanted connection to ground as soon as it is deenergized. Thus a complete restoration of the engine ignition circuit, which would be interfered with by such unwanted connection to ground, is effected immediately upon the withdrawal of the pawl.

The foregoing is intended to indicate one possible use of the invention. It is to be understood that the invention is not limited to use in an overdrive transmission circuit, however, but is broadly intended for use in any multiple circuit where two or more electrical devices are operating from a common power source and an indication of the condition of operation of one of the devices is required. With the foregoing in mind, then, the primary object of the invention is to provide an indicator assembly embodying an indicator and a control relay therefor, directly associated with the indicator in the assembly, and drawing an extremely light current so that it may be embodied in the circuit with a sensitive electrical device the energization of which is to be indicated but which cannot have any considerable amount of current for energizing the indicator, taken from its own circuit.

More specifically, the invention aims to provide an indicator assembly including a control relay in the form of a miniature solenoid in the base of the assembly.

Other objects will become apparent in the ensuing specifications and appended drawings in which:

Fig. 1 is an inverted plan view of the indicator light assembly of my invention, with parts broken away and shown in section to better illustrate the internal construction;

Fig. 2 is an axial sectional view thereof taken on the line 2—2 of Fig. 1;

Fig. 3 is a fragmentary axial sectional view thereof taken on the line 3—3 of Fig. 1; and Fig. 4 is a wiring diagram schematically illustrating the arrangement of the invention in a multiple circuit.

Description of the indicator unit of the invention

As an example of one form in which the invention may be embodied, I have shown, in the drawing, an indicator lamp assembly D embodying, generally, an indicator lamp A, a miniature solenoid B to establish a circuit thereto, and a housing and lens assembly which is indicated generally at C.

The housing and lens assembly C embodies a barrel in two sections 7 and 8, axially separated by a sleeve 9 of insulating material disposed in an internal counterbore in barrel section 7 and receiving a reduced extension portion 10 of section 8. Barrel 7, 8 is received within a casing 11 which has a lining 12 of insulating material. At this point, it may be noted that the lens portion of the housing assembly, which is exposed, and the casing portion 11 thereof, by which it is mounted in an instrument panel or the like, are both insulated from the inner barrel section 8, which forms a part of the electrical circuit of the assembly.

The lens portion of the lens and housing assembly includes an annular lens holder nut 13, threaded onto the outer end of outer barrel section 7 and having a radially inwardly extending annular flange 14 against which the tip of indicator light A is seated; and a lens holder collar 15 having a retainer flange 16 which, through an interposed gasket 17, abuts the rear end of nut 13 to secure collar 15 thereon, and which has at its forward end an inturned flange 18 which retains the rim of a lens 19. Fange 14 defines a light emitting aperture through which light rays are emitted from lamp A. A lens retainer ring 20 and iris 21, for adjusting the light aperture, are interposed between lens 19 and nut 13. The parts just described do not specifically form a part of the present invention.

Externally threaded upon casing 11 are a pair of nuts 22, by means of which the casing may be mounted in an aperture in an instrument panel 23 or the like.

Metal base 24 of indicator light A is in electrical contact with a washer 25 which in turn rests against the forward end of a coil spring 26 received within the rear portion of barrel section 8. The opposite end of coil spring 26 is abutted against a flange 27 extending radially inwardly from the rear end of barrel section 8 and integral therewith. Spring 26 is under compression between flange 27 and washer 25. It will now be apparent that spring 26 will yieldingly thrust indicator light A against flange 14, whereby the light will be suspended between flange 14 and washer 25, out of contact with the inner wall of barrel 7, 8.

An electrical circuit to one side of the lamp filament is established through metal base 24, washer 25, coil spring 26, flange 27, and inner barrel section 8, which is indicated in Fig. 4 as a conductor. The central end contact 28 of indicator light A functions as one contact of the relay by which the lamp circuit is established, being positioned for engagement by the other relay contact which constitutes the armature 29 of the miniature solenoid B, the latter including an energizing coil 30. Coil 30 is piloted within the flange 27 of barrel section 8, being thus maintained in radialy spaced relation to barrel section 8, defining therewith an annular space 31 in which the rear end of spring 26 is received.

Armature 29 is axially slidable in a bearing bushing 32 which extends through coil 30, through a retainer washer 33 seated against the forward end of coil 30, through a coaxial assembly of insulating washers 34, 35, 36, 37 and 38, through the hub member 39 of a terminal 40 constituting one of the three terminal connectors of the assembly. The ends of bushing 32 are peened over against retainer washer 33 and hub member 39 respectively, to retain the entire assembly of insulating washers and coil 30, in assembly.

Combined armature and movable relay contact 29 is electrically connected to terminal 40 through bushing 32 and hub member 39, and is normally maintained out of engagement with end contact 28 of indicator lamp A, by means of a small light conical coil spring 41 engaged under compression between hub member 39 and a head 42 on the rear end of armature 29.

Washer 38 overlaps the rear end of casing 11 to constitute a cap for the casing assembly. A ground terminal member 43 has a hub portion 44, bent at right angles thereto, and received between washers 36 and 38, with terminal 43 extending through a slot in washer 38 as indicated in Fig. 2. Hub member 44 has a central opening in which the small washer 37 is received, so as to insulate terminal 43 from bushing 32.

A third terminal 45 extends through registering apertures in washers 38 and 36 and has a hub portion 46 which is sandwiched between washers 34 and 36. Hub portion 46 is annular, with a central opening in which washer 35 is received so as to insulate terminal 45 from sleeve 32.

One end of coil 30 is electrically connected to terminal 43, as indicated at 47 in Fig. 3. The other end of coil 30 is electrically connected to inner barrel section 8 as indicated at 48 in Fig. 3. Tube section 8, in turn, is connected to contact 45 by an extension thereof indicated at 49 in Fig. 3. Extension 49 has at its rear end a finger 50 extending radially inwardly and bearing directly against hub member 46.

Fig. 4 illustrates how the filament of lamp A is connected at one end to center contact 28 and at its other end to barrel section 8. Fig. 4 also illustrates how indicator unit D may be connected into an overdrive control circuit by a power lead 61 connected to terminal 45 (and thus to lamp A and coil 30); a ground connection for coil 30, through terminal 43; and a ground connection for lamp A through contacts 28, 29 of relay B, and through terminal 40.

*Illustration of incorporation of invention in an overdrive transmission*

Fig. 4 illustrates how the filament of lamp A is isolated from an unwanted ground connection in an overdrive indicator system. Such system, indicated schematically in Fig. 4, may include an overdrive control element 52 having a notch 53 to receive a locking pawl 54 which, when engaged in notch 53, will hold element 52 stationary in order to establish overdrive gear ratio in an overdrive transmission.

Pawl 54 is under the joint control of a solenoid unit 55, urging it toward engagement with notch 53, and a spring, indicated schematically by arrow 56, constantly attempting to withdraw the pawl from notch 53 and effective to do so when solenoid 55 is made inoperative and the grip of rotatable element 52 against pawl 54 is released by momentarily relieving the torque acting therebetween.

Solenoid unit 55 includes an armature 57 connected to pawl 54, an actuator coil 58 for moving the pawl into engagement with notch 53, overcoming the resistance of spring 56, and a holding coil 59 for holding the pawl in engagement after the engagement has been established. Coils 58 and 59 have a common connection to a power lead 60, arranged to bring electric current from the conventional power source (battery) through a connection to ignition at 61, and through an overdrive control relay 62. Holding coil 59 is directly connected to ground, indicated at 63, and actuator coil 58 is connected to ground 63 through a cut-out switch 64 forming part of solenoid unit 55. Switch 64 is normally closed as indicated, and is opened when pawl 54 engages in notch 53, the opening being effected by an actuator element 65 connected to and moving with armature 57.

The conventional overdrive control mechanism includes, in addition to the mechanism just described, a governor switch 66 including a rotatable, centrifugal force responsive contact element 67 which is normally open and which closes by centrifugal action against a contact connected to ground at 68 when its speed increases to the pre-selected lower limit of the overdrive range of the transmission. The conventional control system further includes a kick-down switch unit 69 having a movable contact head 70 which is normally closed against an upper set of contacts 71 so as to establish a connection through conductors 72, 73 from ground 68 to the energizing coil 74 of relay 62, the circuit through coil 74 being completed by a direct connection 75 to the power connection 61. When relay 62 is thus energized, its normally open contacts 76 are closed to establish a connection from the power source through power lead 60 to solenoid unit 55, thus moving pawl 54 against rotatable element 52 and causing it to engage in notch 53 when the latter is properly aligned with pawl 54.

Kick-down switch unit 69 includes a lower set of contacts 77 for engagement by contact head 70 to momentarily short out the ignition by establishing a shunt to ground across the distributor through conductors 78 and 79, and through a ground release switch 80 and a conductor 81. Ground release switch 80 is normally open and is closed by the action of an actuator element 82, connected to and moving with armature 57, when pawl 54 is engaged in notch 53. Thus, the withdrawal of pawl 54 from notch 53 opens the ground circuit 77—81 so as to reestablish the flow of power through the distributor.

All of the electrical system described above is included within the conventional overdrive control apparatus.

*Operation*

It will now be apparent that, with kick-down switch 69 normally closed against upper contact 71 as shown in the drawing, the closing of governor switch 66 upon an increase in speed to the selected overdrive speed, will effect the energization of relay 62, closing contacts 76 to establish an energizing circuit to solenoid unit 55 through actuator coil 58 thereof which is connected to ground 63 through switch 64, standing in its normally closed position. Thereupon, the retracting force of spring 56 will be overcome and pawl 54 will be moved into engagement with notch 63 upon proper alignment of the latter with the pawl (as by momentarily relieving the driving torque). If it is then desired to "kick-down" the transmission into direct drive, for quick acceleration, the accelerator pedal is fully depressed, breaking the circuit to relay 62 through contact 71, thus causing relay 62 to open and break the circuit to solenoid unit 55; and simultaneously grounding the ignition for an instant by closing the circuit across contacts 77, thereby producing a momentary torque reversal which disengages pawl 54 from notch 53 and allows spring 56 to withdraw the pawl. The withdrawing action is accompanied by a reclosing of switch 64 and a reopening of switch 80.

The invention, as applied to such an overdrive control system, has one side of indicator lamp A supplied with power through terminal 45, and its other side connected to switch 80 as indicated.

In the operation of my improved indicator unit in the overdrive control circuit described above, current will be brought to lamp A through overdrive control relay 62 whenever governor switch 66 is closed. Miniature relay B, permanently connected to ground through terminal 43, will thus be continuously energized as long as relay 62 is closed, and contacts 28, 29 will correspondingly be engaged to place lamp A in communication with the current source. Thus, when pawl 54 is engaged, closing switch 80, the circuit through lamp A will be completed to indicate the fact that the transmission is actually "in overdrive," whereas when pawl 54 is disengaged, opening switch 80, lamp A will be correspondingly extinguished to indicate the fact that the transmission is "out of overdrive," irrespective of the actual speed of the vehicle and the condition of governor switch 66.

The most convenient means of connecting power lead 85 of indicator unit D to the power source, is through a connection to relay 62 in parallel with existing power lead 60, which places lamp A in communication with ground at 63 through power lead 60 and holding coil 59. Any direct connection of the other side of lamp A to conductor 79 would result in an undesirable feed-back circuit through the filament of lamp A from the distributor to ground, throughout the continued engagement of contact 77 by head 70 of kick-down switch 69, even after the breaking of the connection to ground 63 through switch 80, thus preventing or undesirably delaying the reestablishing of the ignition circuit. Such undesirable feed-back circuit would extend from the distributor through conductors 78 and 79, thence through the filament of lamp A and through conductors 85 and 60 and holding coil 59 to ground at 63. To avoid this undesirable condition, the invention provides the miniature solenoid relay B, which is interposed between lamp A and terminal 40 so as to isolate filament A from its communication with the grounding conductor 79, immediately when relay 62 opens. The opening of relay 62 interrupts the flow of current to miniature relay B, causing armature 29 to move away from contact 28.

It may be noted that the coil 30 of miniature relay B will constantly draw a small proportion of the current coming through relay 62, as long as the latter is closed. Only a slight portion of the electric current flowing in the circuit of relay 62 is thus diverted, however, and it is sufficient to impair the operation of relay 62, or the functioning of holding coil 59 in maintaining pawl 54 engaged in notch 53, even though relay 62 and solenoid 55 may be fairly sensitive instruments. This is one of the important characteristics of the invention, the miniature relay B being adapted to consume such a slight portion of the available current, that it can be placed in parallel with the instruments already existing in the conventional circuit, and arranged to constantly divert a small portion of current supplied to those instruments, without impairing the functioning thereof.

In the event an operator should depress kick-down switch 69 just sufficiently to extinguish lamp A without completing the withdrawal of pawl 12 to take the mechanism out of overdrive, the indicator lamp will immediately be relighted as soon as the pressure is relieved from the kick-down switch 69 and contact 70 reengages contacts 71, thus indicating that the operator has failed to release the transmission from overdrive.

It is to be understood that the foregoing detailed description of the arrangement and functioning of my improved signal lamp assembly in an overdrive transmission control circuit, is given by way of illustration of one possible use of the invention in connection with fairly sensitive instruments in an electrical control circuit, and that the invention may equally well be applied to other control systems or electrical circuits in which it may be desired to indicate a particular condition existing in the circuit, and to utilize a portion of the electrical energy flowing in the circuit, without impairing the operation of the already existing sensitive instruments of the circuit.

The invention provides a compact arrangement of a barrel having an apertured abutment at one end thereof, an indicator light mounted in that end of the barrel, a solenoid mounted in the other end of the barrel closely adjacent the inner end of the indicator light, and a coil spring for yieldingly retaining the indicator light against the apertured end abutment, with the solenoid spaced inwardly from the housing to define an annular space receiving a portion of the coil spring, whereby the solenoid is at least partially telescoped within the coil spring for maximum axial compactness. The invention also provides an improved arrangement of a rear cap assembly including several insulating washers between which the hub portions of several terminals are sandwiched, whereby three separate terminals, insulated from each other, may be utilized.

I claim:

1. In an indicator light assembly for use in indicating the operational condition of a sensitive current consuming device including an indicator lamp having a base portion providing a central tip contact and an annular base contact; a tubular housing having at one end a lens cap defining a central light aperture and a lens mounted therein and having at its other end a terminal base of insulating material; a solenoid coil within said housing mounted on the inner side of said base in coaxial opposed relation to the inner end of said lamp, said coil having a peripheral diameter of smaller radius than that of the inner wall of said housing and being spaced therefrom to define an annular recess; a coil spring having one end thereof received in said recess and supported by the housing and its opposite end in yielding pressure transmitting relation to the end of said lamp around said tip contact for pressing the opposite end of the lamp against said lens cap and piloting the same in said light aperture, whereby to provide a cushioned suspension of said lamp between said coil spring and said lens cap; a bearing tube extending coaxially through said solenoid and through said base, with its inner end in adjacent, spaced, aligned relation to said tip contact and in securing relation to said solenoid coil to secure the same against said base; a terminal attached to the outer side of said base and electrically connected to said bearing tube; a one-piece solenoid armature functioning also as a movable contact, extending axially through said bearing tube, said armature having a head at its outer end; a spring engaged under compression between said head and the outer side of said base, for yieldingly urging said armature away from engagement with said tip contact, said armature, in response to energization of said solenoid, being slidable inwardly in said bearing tube into engagement with said tube contact for establishing connection between said terminal and tip contact; a pair of additional terminals mounted to said base and electrically connected to opposite ends of said solenoid coil; and an electrical connection between one of said pair of terminals and said annular base contact of the lamp.

2. In an indicator light assembly for use in indicating the operational condition of a sensitive current consuming device including an indicator lamp having a base portion providing a central tip contact and an annular base contact; a tubular housing having at one end a lens cap defining a central light aperture and a lens mounted therein and having at its other end a terminal base of insulating material; a solenoid coil within said houing mounted on the inner side of said base in coaxial opposed relation to the inner end of said lamp; a coil spring having one end thereof supported by the housing and its opposite end in yielding pressure transmitting relation to the end of said lamp around said tip contact for pressing the opposite end of the lamp against said lens cap and piloting the same in said light aperture, whereby to provide a cushioned suspension of said lamp between said coil spring and said lens cap; a bearing tube extending coaxially through said solenoid and through said base, with its inner end in adjacent, spaced, aligned relation to said tip contact and in securing relation to said solenoid coil to secure the same against said base; a terminal attached to the outer side of said base and electrically connected to said bearing tube; a one-piece solenoid armature functioning also as a movable contact, extending axially through said bearing tube, said armature having a head at its outer end; a spring engaged under compression between said head and the outer side of said base, for yieldingly urging said armature away from engagement with said tip contact, said armature, in response to energization of said solenoid, being slidable inwardly in said bearing tube into engagement with said tip contact for establishing connection between said terminal and tip contact; a pair of additional terminals mounted to said base and electrically connected to opposite ends of said solenoid coil; and an electrical connection between one of said pair of terminals and said annular base contact of the lamp.

3. In an indicator light assembly for use in indicating the operational condition of a sensitive current consuming device including an indicator lamp having a base portion providing a central tip contact and an annular base contact; a tubular outer housing having at one end a lens cap defining a light aperture and a lens mounted therein and having at its other end a terminal base comprising a plurality of stacked washers of insulating material; an inner lining sleeve within said outer housing and insulated therefrom, said sleeve having a radially inwardly projecting flange adjacent said insulator base; a solenoid coil within said housing and projecting into said lining sleeve, said coil being mounted on the inner side of said insulator base in coaxial opposed spaced relation to the inner end of said lamp, and being of smaller diameter than the inner diameter of said lining sleeve and radially spaced therefrom to define an annular recess; a coil spring having one end portion received in said annular recess and abutted against said flange and its opposite end in yielding pressure transmitting association with the base end of said lamp for yieldingly pressing the opposite end of the lamp against said lens cap and into piloting engagement in said aperture, whereby to provide a cushioned suspension of said lamp between said coil spring and lens cap; a bearing tube extending coaxially through said solenoid and through said base, with its inner end in adjacent spaced aligned relation to said tip contact and engaging said coil to secure the same to said base; a terminal attached to the outer side of said base and electrically connected to the outer end of said bearing tube; a pair of additional terminals extending through the outer washers of said stack and having inner end portions bent at right angles and sandwiched between respective pairs of washers, said pair of terminals being electrically connected to respective ends of said coil and one of them being connected to said lining sleeve, said coil spring providing electrical connection between said lining sleeve and said annular base contact; and a one-piece solenoid armature functioning also as a movable contact, extending axially through said bearing bushing, said armature having a head at its outer end; a retractor spring engaged under compression between said head and the outer side of said base, for yieldingly urging said armature away from engagement with said tip contact, said armature, in response to energizing of said solenoid, being slidable in said bearing tube into engagement with said tip contact, whereby to establish electrical connection between the latter and said first mentioned terminal.

4. An indicator light assembly as defined in claim 3, wherein said first mentioned terminal has a head portion bearing against the outer side of said insulator base, the outer end of said bearing tube extending through said head portion and engaging the same to secure it to said insulator base, and said retractor spring being a small coil spring surrounding said armature and engaged under compression between said head portion and said armature head.

References Cited in the file of this patent

UNITED STATES PATENTS

| | | |
|---|---|---|
| 860,153 | Rowley | July 16, 1907 |
| 1,092,415 | Wetter | Apr. 7, 1914 |
| 1,574,513 | Ratliff et al. | Feb. 23, 1926 |
| 1,738,206 | Riddles | Dec. 3, 1929 |
| 2,187,831 | Lange | Jan. 23, 1940 |